(12) United States Patent
Ben-Zvi

(10) Patent No.: US 7,500,245 B2
(45) Date of Patent: Mar. 3, 2009

(54) CHANGING CODE EXECUTION PATH USING KERNEL MODE REDIRECTION

(75) Inventor: Nir Ben-Zvi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 11/177,079

(22) Filed: Jul. 8, 2005

(65) Prior Publication Data

US 2007/0011686 A1    Jan. 11, 2007

(51) Int. Cl.
    *G06F 9/44* (2006.01)
(52) U.S. Cl. .................. 719/310; 710/260
(58) Field of Classification Search ........... 710/260, 710/269; 718/100; 717/130, 158, 106, 120, 717/121, 127; 712/240, 220, 226, 233, 244; 711/154; 719/310
    See application file for complete search history.

(56) References Cited

U.S. PATENT DOCUMENTS

| | | | | |
|---|---|---|---|---|
| 5,671,396 A | * | 9/1997 | Gavish | .................. 703/27 |
| 5,867,699 A | * | 2/1999 | Kuslak et al. | .............. 712/240 |
| 5,991,790 A | * | 11/1999 | Shah et al. | .................. 718/100 |
| 6,775,728 B2 | * | 8/2004 | Zimmer et al. | .............. 710/260 |
| 6,961,941 B1 | * | 11/2005 | Nelson et al. | .............. 719/319 |
| 7,149,832 B2 | * | 12/2006 | Wieland et al. | ............. 710/269 |
| 2003/0145314 A1 | * | 7/2003 | Nguyen et al. | .............. 717/158 |
| 2003/0182431 A1 | * | 9/2003 | Sturniolo et al. | ............ 709/227 |
| 2005/0060462 A1 | * | 3/2005 | Ota | ........................... 710/260 |
| 2006/0112241 A1 | * | 5/2006 | Weiss et al. | ................. 711/154 |
| 2006/0123400 A1 | * | 6/2006 | Burdick et al. | ............. 717/130 |
| 2007/0074223 A1 | * | 3/2007 | Lescouet et al. | ........... 718/108 |

\* cited by examiner

*Primary Examiner*—Van H Nguyen
(74) *Attorney, Agent, or Firm*—Woodcock Washburn LLP

(57) ABSTRACT

A mechanism for redirecting a code execution path in a running process. A one-byte interrupt instruction (e.g., INT 3) is inserted into the code path. The interrupt instruction passes control to a kernel handler, which after executing a replacement function, returns to continue executing the process. The replacement function resides in a memory space that is accessible to the kernel handler. The redirection mechanism may be applied without requiring a reboot of the computing device on which the running process is executing. In addition, the redirection mechanism may be applied without overwriting more than one byte in the original code.

12 Claims, 2 Drawing Sheets

CHANGING CODE EXECUTION PATH USING KERNEL MODE REDIRECTION

FIELD OF THE INVENTION

This invention relates in general to the field of computer software. More particularly, this invention relates to a method of updating a process running in memory.

BACKGROUND OF THE INVENTION

It is often desirable to change a code execution path in a running process without changing the original on-disk image of the executing modules or without requiring a restart of the computer. One way to accomplish this is via a "Hotpatching" mechanism. Hotpatching is in-memory patching mechanism that enables the installation of software updates without requiring users to restart their computers by automatically inserting code from a software update into a running process. This means that system files can be updated while they are in use.

For example, Hotpatching may bypass a vulnerable function in a running process by injecting a JMP instruction at the beginning of the vulnerable function. When the function is called, it jumps to a new function that is also loaded into the process space by the Hotpatching mechanism. The problem with this approach is that an injected JMP instruction may overwrite multiple instructions in a way that leads to unexpected behavior. In the Hotpatching case, if the beginning of the vulnerable function includes 3 assembly opcodes in the first 5 bytes (1 byte opcode, 2 bytes opcode, 2 bytes opcode), the JMP injection will replace all five bytes. If the processor is executing the first byte opcode, and the injection has changed the next two opcodes, unexpected processor behavior may result.

SUMMARY OF THE INVENTION

A mechanism for redirecting a code execution path in a running process. A one-byte interrupt instruction (e.g., INT 3) is inserted into the code path. The interrupt instruction passes control to a kernel handler, which after executing a replacement function, returns to continue executing the process. The replacement function resides in a memory space that is accessible to the kernel handler. The redirection mechanism may be applied without requiring a reboot of the computing device on which the running process is executing. In addition, the redirection mechanism may be applied without overwriting more than one byte in the original code.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
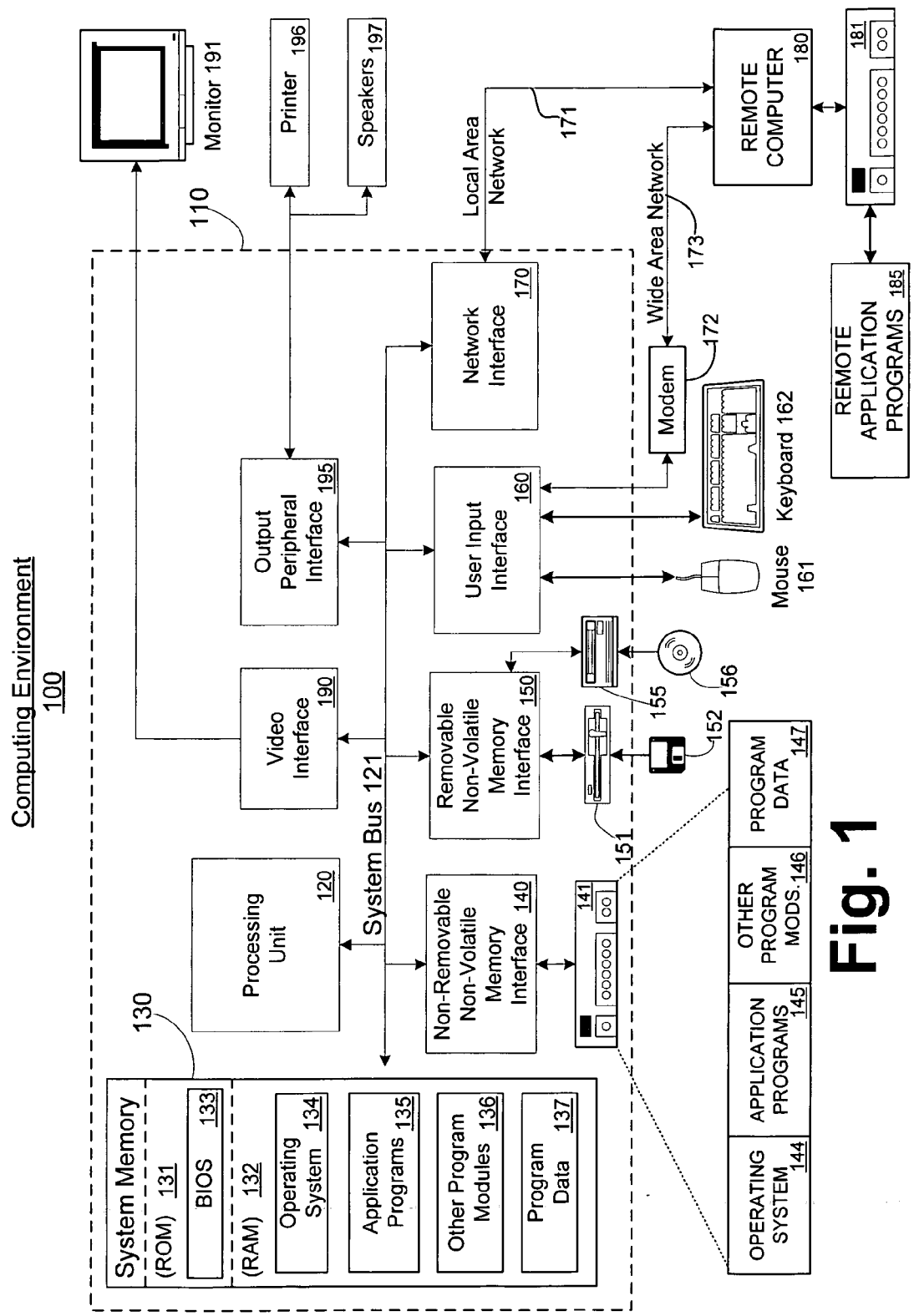
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 10 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DYD) or other optical disk storage, magnetic cassettes, magnetic tape, magnetic disk storage or other magnetic storage devices, or any other medium that can be used to store the desired information and that can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Exemplary Embodiments

The present invention is directed to a mechanism for redirecting a code execution path in a running process in memory that does not lead to unexpected behavior by advantageously using a one-byte interrupt instruction (e.g., INT 3) that is inserted into the code path. The interrupt instruction passes control to a kernel handler, which after executing a replacement function, returns to continue executing the process.

Figure 2:
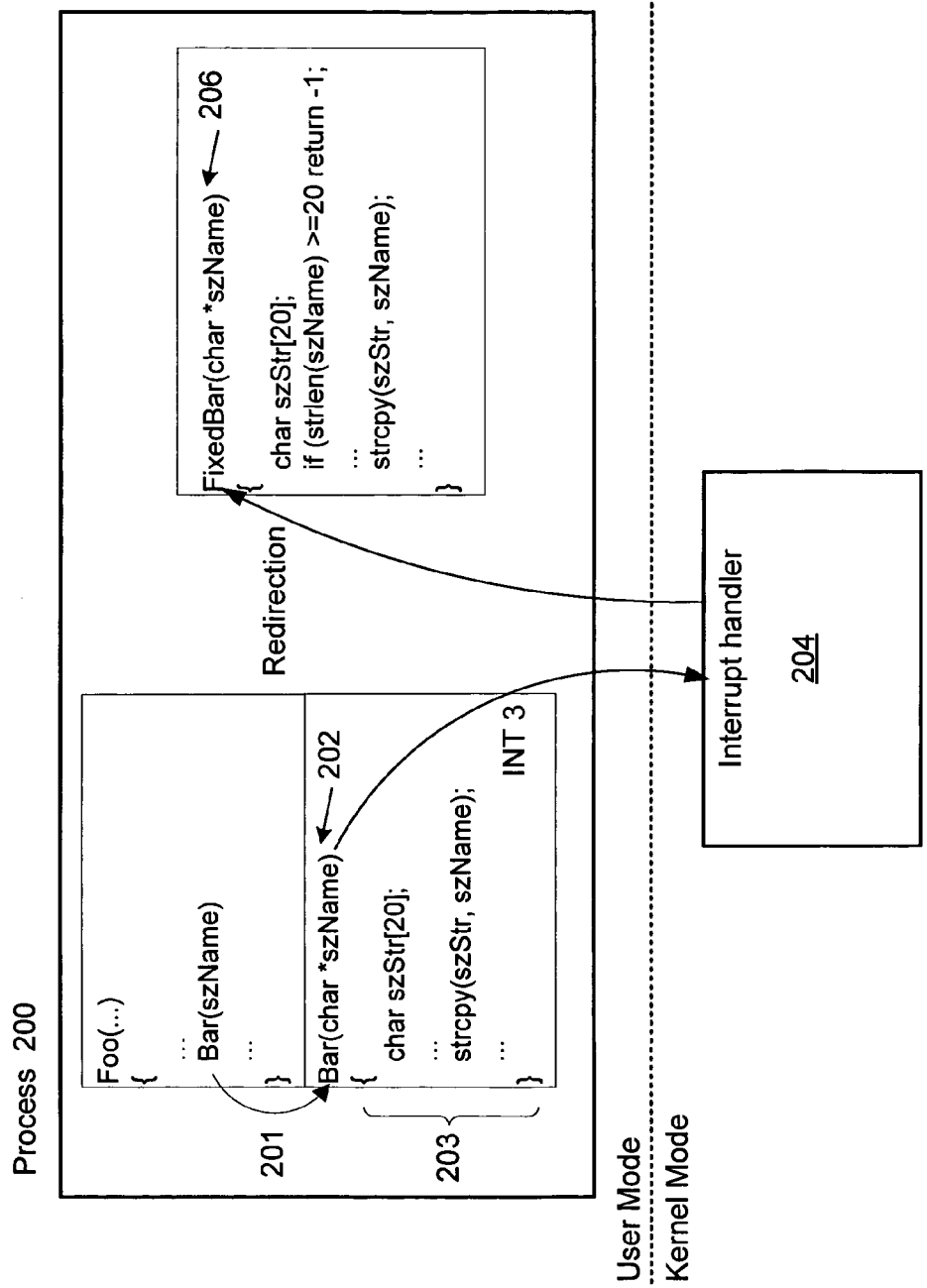
FIG. 2 illustrates an exemplary process performed in accordance with the present invention.

With reference to FIG. 2, there is illustrated an exemplary process 200 running in memory. In accordance with the present invention, an execution path 201 (e.g., the beginning of a vulnerable function to be replaced) of the process 200 running in memory may be changed by overwriting an existing instruction 202 with a one byte interrupt instruction (e.g., INT 3), where the remainder of the original code 203 remains unaltered. INT 3 is typically used as a trap to a debugger to break out of execution in order for other code to be executed.

The interrupt instruction will cause a kernel handler 204 to be called. The kernel handler 204 for that interrupt includes a mechanism that will cause a return from the interrupt to continue into a new instruction 206 (e.g., the replacement function) instead of returning to the original function. The new instruction 206 is placed in a memory space known to the kernel handler 204. Because the interrupt instruction is a one byte instruction, the present invention advantageously provides a mechanism for code diversion that does not overwrite more than one byte in the original code 203.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method of redirecting a code execution path in a running process, the code execution path including a plurality of instructions, the method comprising:
   modifying a kernel handler to upon being called by a first function, returning to an instruction in a replacement function that is separate from the first function;
   overwriting a single one byte instruction in said code execution path with a one byte interrupt instruction while simultaneously leaving a remainder of instructions in the code execution path unaltered, whereupon execution of the one byte interrupt instruction in the running process causes the kernel handler to be called;
   executing the replacement function called by said kernel handler; and
   returning to said code execution path,
   wherein said method is performed without requiring a reboot of a computing device on which said running process is executing.

2. The method of claim 1, wherein said one byte interrupt instruction is used as a trap to a debugger.

3. The method of claim 2, wherein said one byte interrupt instruction is an INT 3 interrupt instruction.

4. The method of claim 2, wherein modifying said kernel handler includes comprises providing a mechanism to cause a return from said one byte interrupt instruction to continue into said replacement function.

5. The method of claim 2, wherein the trap to the debugger breaks out of execution in order for other code to be called.

6. The method of claim 1, further comprising loading said replacement function into a memory space accessible by said kernel function.

7. The method of claim 1, further comprising performing said method without requiring a reboot of a computing device on which said running process is executing.

8. A computer readable storage medium having computer executable instructions thereon for redirecting a code execution path in a running process, said computer executable instructions performing a method, comprising:
   modifying a kernel handler to upon being called by a first function, returning to an instruction in a replacement function that is separate from the first function;
   overwriting a single one byte instruction in said code execution path with a one byte interrupt instruction while simultaneously leaving a remainder of instructions in the code execution path unaltered, whereupon execution of the one byte interrupt instruction in the running process causes the kernel handler to be called;
   executing the replacement function called by said kernel handler; and
   returning to said code execution path,
   wherein said method is performed without requiring a reboot of a computing device on which said running process is executing.

9. The computer readable storage medium of claim 8, wherein said one byte interrupt instruction is an INT 3 interrupt instruction.

10. The computer readable storage medium of claim 8, wherein said kernel handler includes a mechanism to cause a return from said one byte interrupt instruction to continue into said replacement function.

11. The computer readable storage medium of claim 8, further comprising instructions for inserting said instruction such that no more than one byte in the original code in said code path is overwritten.

12. The computer readable medium storage of claim 8, further comprising instructions for loading said replacement function into a memory space accessible by said kernel function.

* * * * *